(12) United States Patent
Shiratori et al.

(10) Patent No.: US 11,698,579 B2
(45) Date of Patent: Jul. 11, 2023

(54) WAVELENGTH CONVERSION ELEMENT, LIGHT SOURCE DEVICE, PROJECTOR, AND METHOD OF MANUFACTURING WAVELENGTH CONVERSION ELEMENT

(71) Applicant: SEIKO EPSON CORPORATION, Tokyo (JP)

(72) Inventors: Koya Shiratori, Matsumoto (JP); Wataru Yasumatsu, Azumino (JP); Takashi Gokuden, Azumino (JP); Kunihiko Yano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 223 days.

(21) Appl. No.: 17/198,364

(22) Filed: Mar. 11, 2021

(65) Prior Publication Data
US 2021/0286253 A1 Sep. 16, 2021

(30) Foreign Application Priority Data
Mar. 12, 2020 (JP) .............................. JP2020-043298

(51) Int. Cl.
*G03B 33/12* (2006.01)
*G03B 21/20* (2006.01)

(52) U.S. Cl.
CPC ........... *G03B 33/12* (2013.01); *G03B 21/204* (2013.01); *G03B 21/2066* (2013.01)

(58) Field of Classification Search
None
See application file for complete search history.

(56) References Cited

U.S. PATENT DOCUMENTS

| | | | |
|---|---|---|---|
| 2003/0116719 A1 | 6/2003 | Miyazawa | |
| 2005/0015736 A1 | 7/2005 | Miyazawa | |
| 2016/0091712 A1* | 3/2016 | Egawa | G03B 21/204 353/31 |
| 2016/0377968 A1* | 12/2016 | Yasumatsu | H04N 9/3197 353/31 |

FOREIGN PATENT DOCUMENTS

| | | |
|---|---|---|
| CN | 1423510 A | 6/2003 |
| CN | 105467734 A | 4/2016 |
| JP | 2016-099566 A | 5/2016 |
| JP | 6536212 B2 | 7/2019 |

* cited by examiner

*Primary Examiner* — Bao-Luan Q Le
*Assistant Examiner* — Danell L Owens
(74) *Attorney, Agent, or Firm* — Oliff PLC

(57) ABSTRACT

A wavelength conversion element according to the present disclosure includes a substrate, a dichroic layer provided to a first surface of the substrate, an intermediate layer disposed so as to be opposed to the substrate via the dichroic layer, and a wavelength conversion layer disposed so as to be opposed to the dichroic layer via the intermediate layer, and configured to convert light in a first wavelength band into light in a second wavelength band. The dichroic layer has two or more types of refractive index layers having respective refractive indexes different from each other.

12 Claims, 9 Drawing Sheets

WAVELENGTH CONVERSION ELEMENT, LIGHT SOURCE DEVICE, PROJECTOR, AND METHOD OF MANUFACTURING WAVELENGTH CONVERSION ELEMENT

The present application is based on, and claims priority from JP Application Serial Number 2020-043298, filed Mar. 12, 2020, the disclosure of which is hereby incorporated by reference herein in its entirety.

BACKGROUND

1. Technical Field

The present disclosure relates to a wavelength conversion element, a light source device, a projector, and a method of manufacturing a wavelength conversion element.

2. Related Art

As a light source device used for a projector, there is proposed a light source device using fluorescence emitted from a phosphor when irradiating the phosphor with excitation light emitted from a light emitting element. In JP-A-2016-99566 (Document 1), there is disclosed a wavelength conversion element provided with a phosphor layer, an intermediate layer, a dielectric multilayer film, a bonding layer, and a substrate. In Document 1, there is described the fact that the refractive index of the intermediate layer is in a range of, for example, 2.2 through 2.4, and the refractive index of the phosphor layer is 1.83.

In Document 1, there is a description that since the intermediate layer having the refractive index higher than the refractive index of the phosphor layer is provided, the incident angle of the fluorescence to the dielectric multilayer film can be made smaller compared to when the intermediate layer is not provided, and therefore, the fluorescence reflected by the dielectric multilayer film increases, and thus, it is possible to increase the use efficiency of the fluorescence. However, in Document 1, since the Brewster condition when the fluorescence enters the intermediate layer and the dielectric multilayer film is not taken into consideration, the use efficiency of a P-polarization component included in the fluorescence lowers, and there is a possibility that it is not achievable to increase the use efficiency of the fluorescence.

SUMMARY

In view of the problems described above, a wavelength conversion element according to an aspect of the present disclosure includes a substrate, a dichroic layer provided to a first surface of the substrate, an intermediate layer disposed so as to be opposed to the substrate via the dichroic layer, and a wavelength conversion layer disposed so as to be opposed to the dichroic layer via the intermediate layer, and configured to convert light in a first wavelength band into light in a second wavelength band different from the first wavelength band. The dichroic layer has two or more types of refractive index layers having respective refractive indexes different from each other, and when denoting a refractive index of the wavelength conversion layer by $n_m$, a refractive index of the intermediate layer by $n_{Lm}$, a refractive index of a refractive index layer having a first refractive index out of the two or more types of refractive index layers by $n_L$, and a refractive index of a refractive index layer having a second refractive index out of the two or more types of refractive layers by $n_H$, and $n_H$ is higher than $n_L$, $\theta_B \geq \theta_C$ is fulfilled with respect to $\theta_B$ obtained by a formula (1) described below and $\theta_C$ obtained by a formula (2) described below.

$$\theta_B = \sin^{-1}\sqrt{\frac{n_L^2 n_H^2}{n_m^2(n_L^2 + n_H^2)}} \tag{1}$$

$$\theta_C = \sin^{-1}\left(\frac{n_{Lm}}{n_m}\right) \tag{2}$$

A light source device according to another aspect of the present disclosure includes the wavelength conversion element according to the aspect of the present disclosure, and a light emitting element configured to emit the light in the first wavelength band to the wavelength conversion element.

A projector according to another aspect of the present disclosure includes the light source device according to the aspect of the present disclosure, a light modulation device configured to modulate light from the light source device in accordance with image information, and a projection optical device configured to project the light modulated by the light modulation device.

A method of manufacturing a wavelength conversion element according to another aspect of the present disclosure includes a first step of providing a dichroic layer to a first surface of a substrate, a second step of forming an intermediate layer on a third surface different from a second surface opposed to the first surface of the substrate out of two surfaces of the dichroic layer, or so as to be opposed to a fourth surface of the wavelength conversion layer, a third step of providing a first bonding layer to a first member including the substrate, a fourth step of providing a second bonding layer to a second member including the wavelength conversion layer, and a fifth step of bonding the first bonding layer and the second bonding layer to each other, wherein the dichroic layer has two or more types of refractive index layers having respective refractive indexes different from each other, and when denoting a refractive index of the wavelength conversion layer by $n_m$, a refractive index of the intermediate layer by $n_{Lm}$, a refractive index of a refractive index layer having a first refractive index out of the two or more types of refractive index layers by $n_L$, and a refractive index of a refractive index layer having a second refractive index out of the two or more types of refractive layers by $n_H$, and $n_H$ is higher than $n_L$, $\theta_B \geq \theta_C$ is fulfilled with respect to $\theta_B$ obtained by a formula (1) described below and $\theta_C$ obtained by a formula (2) described below.

$$\theta_B = \sin^{-1}\sqrt{\frac{n_L^2 n_H^2}{n_m^2(n_L^2 + n_H^2)}} \tag{1}$$

$$\theta_C = \sin^{-1}\left(\frac{n_{Lm}}{n_m}\right) \tag{2}$$

DESCRIPTION OF EXEMPLARY EMBODIMENTS

First Embodiment

Figure 1:
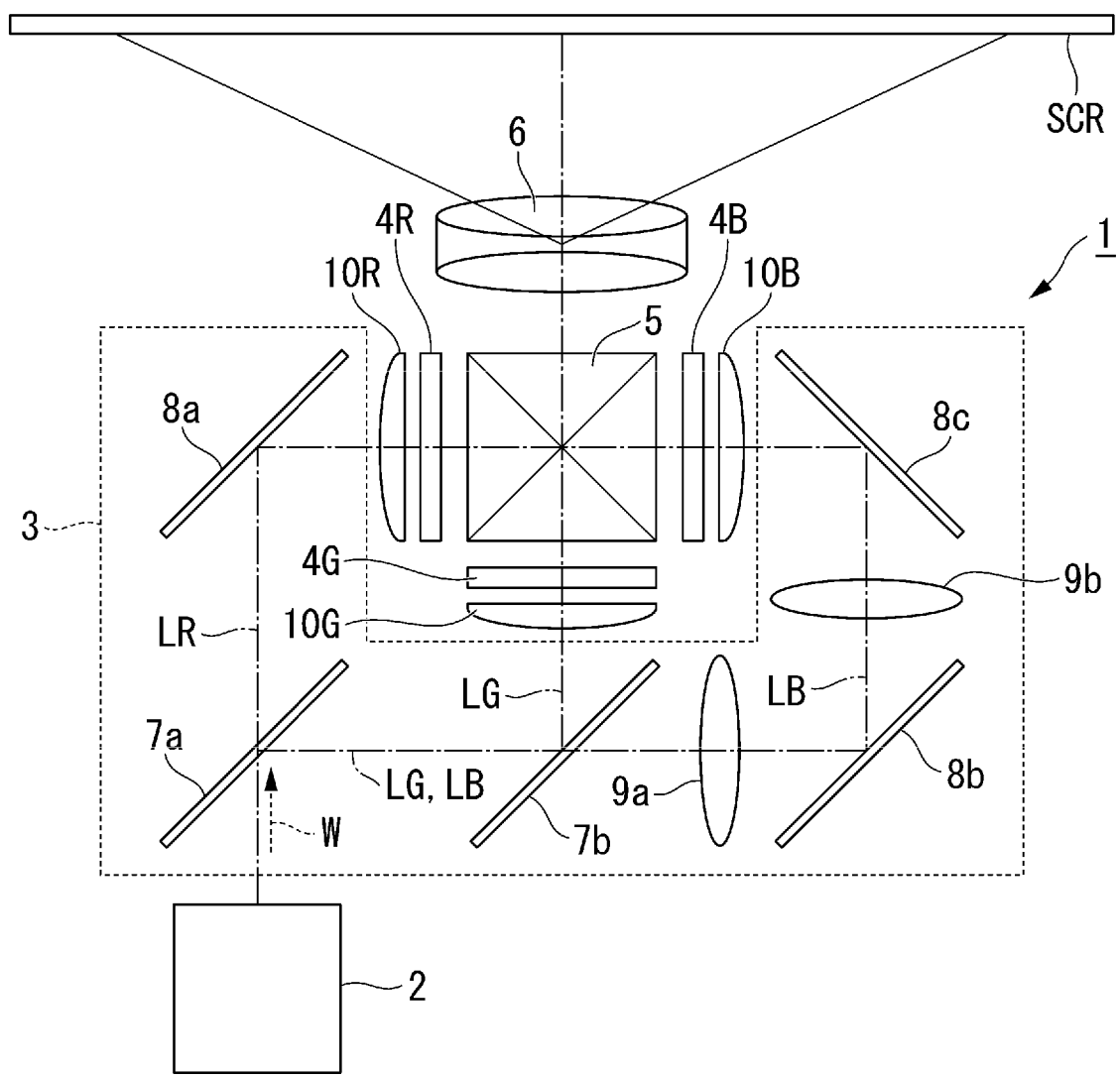
FIG. 1 is a schematic configuration diagram of a projector according to a first embodiment.

A first embodiment of the present disclosure will hereinafter be described using FIG. 1 through FIG. 10.

In the drawings described below, the constituents are shown with the respective scale ratios of the sizes different from each other in some cases in order to make the constituents eye-friendly.

An example of a projector according to the present embodiment will be described.

FIG. 1 is a diagram showing a schematic configuration of the projector 1 according to the present embodiment.

As shown in FIG. 1, the projector 1 according to the present embodiment is a projection-type image display device for displaying a color image on a screen SCR. The projector 1 is provided with an illumination device 2, a color separation optical system 3, a light modulation device 4R, a light modulation device 4G, a light modulation device 4B, a combining optical system 5, and a projection optical device 6. A configuration of the illumination device 2 will be described later.

The color separation optical system 3 is provided with a first dichroic mirror 7a, a second dichroic mirror 7b, a reflecting mirror 8a, a reflecting mirror 8b, a reflecting mirror 8c, a relay lens 9a, and a relay lens 9b. The color separation optical system 3 separates illumination light WL emitted from the illumination device 2 into red light LR, green light LG, and blue light LB, and then guides the red light LR to the light modulation device 4R, guides the green light LG to the light modulation device 4G, and guides the blue light LB to the light modulation device 4B.

A field lens 10R is disposed between the color separation optical system 3 and the light modulation device 4R, and substantially collimates the incident light and then emits the result toward the light modulation device 4R. A field lens 10G is disposed between the color separation optical system 3 and the light modulation device 4G, and substantially collimates the incident light and then emits the result toward the light modulation device 4G. A field lens 10B is disposed between the color separation optical system 3 and the light modulation device 4B, and substantially collimates the incident light and then emits the result toward the light modulation device 4B.

The first dichroic mirror 7a transmits a red light component, and reflects a green light component and a blue light component. The second dichroic mirror 7b reflects the green light component, and transmits the blue light component. The reflecting mirror 8a reflects the red light component. The reflecting mirror 8b and the reflecting mirror 8c reflect the blue light component.

The red light LR having been transmitted through the first dichroic mirror 7a is reflected by the reflecting mirror 8a, and is then transmitted through the field lens 10R to enter an image forming area of the light modulation device 4R for the red light. The green light LG having been reflected by the first dichroic mirror 7a is further reflected by the second dichroic mirror 7b, and then transmitted through the field lens 10G to enter an image forming area of the light modulation device 4G for the green light. The blue light LB having been transmitted through the second dichroic mirror 7b enters an image forming area of the light modulation device 4B for the blue light via the relay lens 9a, the reflecting mirror 8b at the incident side, the relay lens 9b, the reflecting mirror 8c at the exit side, and the field lens 10B.

The light modulation device 4R, the light modulation device 4G, and the light modulation device 4B each modulate the colored light having entered the light modulation device in accordance with image information to thereby form image light. The light modulation device 4R, the light modulation device 4G, and the light modulation device 4B are each formed of a liquid crystal light valve. Although not shown in the drawings, at the light incident side of each of the light modulation device 4R, the light modulation device 4G, and the light modulation device 4B, there is disposed an incident side polarization plate. At the light exit side of each of the light modulation device 4R, the light modulation device 4G, and the light modulation device 4B, there is disposed an exit side polarization plate.

The combining optical system 5 combines the image light emitted from the light modulation device 4R, the image light emitted from the light modulation device 4G, and the image light emitted from the light modulation device 4B with each other to form full-color image light. The combining optical system 5 is formed of a cross dichroic prism which has four rectangular prisms bonded to each other, and which has a substantially square shape in plan view. On the interfaces having a substantially X shape on which the rectangular prisms are bonded to each other, there are formed dielectric multilayer films.

The image light emitted from the combining optical system 5 is projected by the projection optical device 6 in an enlarged manner to form an image on the screen SCR. In other words, the projection optical device 6 projects the light modulated by the light modulation device 4R, the light modulated by the light modulation device 4G, and the light modulated by the light modulation device 4B. The projection optical device 6 is constituted by a plurality of projection lenses.

An example of the illumination device 2 in the present embodiment will be described.

Figure 2:
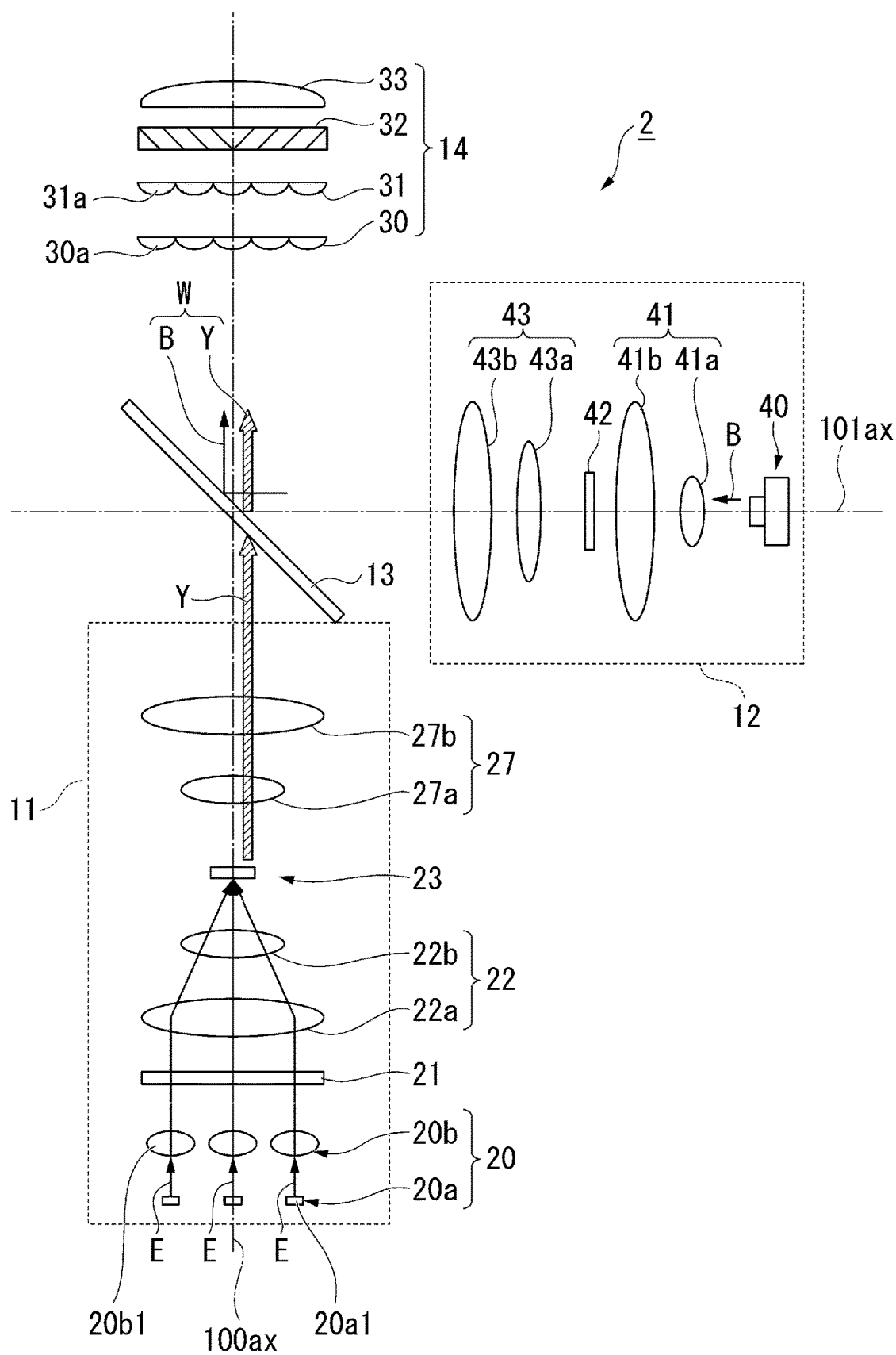
FIG. 2 is a schematic configuration diagram of an illumination device according to the first embodiment.

FIG. 2 is a schematic configuration diagram of the illumination device 2.

As shown in FIG. 2, the illumination device 2 is provided with a first light source device 11, a second light source device 12, a dichroic mirror 13, a homogenization illumination optical system 14. The first light source device 11 in the present embodiment corresponds to a light source device in the appended claims.

The first light source device 11 is provided with a first light source section 20 having light emitting elements 20a1 for emitting excitation light beams E to a wavelength conversion element 23, a diffusion section 21, a light collection optical system 22, the wavelength conversion element 23, and a pickup optical system 27.

The first light source section 20 emits the excitation light beams E toward the wavelength conversion element 23. The first light source section 20 has a light source unit 20a and a collimator optical system 20b. The light source unit 20a is constituted by the plurality of light emitting elements 20a1 for emitting the excitation light beams E as blue light beams having a first wavelength band. The light emitting elements 20a1 are each formed of a semiconductor laser element for emitting a laser beam. A peak wavelength in light emission intensity of the excitation light beams E is, for example, 445 nm.

The plurality of light emitting elements 20a1 is arranged in an array in a single plane perpendicular to an illumination light axis 100ax. It is also possible for the light emitting elements 20a1 to emit the blue light having a peak wavelength other than 445 nm, for example, a peak wavelength of 455 nm or 460 nm. It should be noted that the illumination light axis 100ax is defined as an axis extending along a principal ray of a pencil formed of the plurality of excitation light beams E emitted from the first light source section 20.

The collimator optical system 20b is constituted by a plurality of collimator lenses 20b1. The collimator lenses 20b1 are disposed so as to correspond one-to-one to the light emitting elements 20a1. The plurality of collimator lenses 20b1 is arranged in an array in a single plane perpendicular to the illumination light axis 100ax. The collimator lenses 20b1 each convert the excitation light beam E emitted from the light emitting element 20a1 into parallel light.

The diffusion section 21 diffuses the excitation light beams E emitted from the first light source section 20. In the present embodiment, as the diffusion section 21, there can be used, for example, obscured glass plate made of optical glass.

The light collection optical system 22 collects the excitation light beams E diffused with the diffusion section 21, and then makes the excitation light beams E thus diffused enter the wavelength conversion element 23. In the present embodiment, the light collection optical system 22 is provided with a first lens 22a and a second lens 22b. The first lens 22a and the second lens 22b are each formed of a convex lens. By adopting the light collection optical system 22 having a simple configuration as described above, it is possible to achieve reduction in cost of the first light source device 11.

A configuration of the wavelength conversion element 23 will be described later.

The pickup optical system 27 is provided with a first collimating lens 27a and a second collimating lens 27b. The pickup optical system 27 substantially collimates the fluorescence Y emitted from the wavelength conversion element 23. The first collimating lens 27a and the second collimating lens 27b are each formed of a convex lens.

The fluorescence Y collimated by the pickup optical system 27 enters the dichroic mirror 13. The dichroic mirror 13 is disposed so as to cross each of an optical axis 101ax of the second light source device 12 and the illumination light axis 100ax at an angle of 45°. The dichroic mirror 13 has a characteristic of transmitting the fluorescence Y, and at the same time, reflecting the blue light B from the second light source device 12. It should be noted that the optical axis 101ax is defined as an axis extending along a principal ray of a pencil of the blue light B emitted from a second light source 40.

The second light source device 12 is provided with the second light source 40, a second light collection optical system 41, a scattering plate 42, and a second pickup optical system 43.

The second light source 40 has substantially the same configuration as that of the first light source section 20. In the present embodiment, the second light source 40 has a semiconductor laser for emitting the blue light B, and a collimator lens for collimating the blue light B emitted from the semiconductor laser. It is sufficient for the second light source 40 to have at least one semiconductor laser and at least one collimator lens, or it is possible for the second light source 40 to have a plurality of semiconductor lasers and a plurality of collimator lenses similarly to the first light source section 20.

The second light collection optical system 41 is provided with a first lens 41a and a second lens 41b. The second light collection optical system 41 collects the blue light B emitted from the second light source 40 in the vicinity of the scattering plate 42. The first lens 41a and the second lens 41b are each formed of a convex lens.

The scattering plate 42 scatters the blue light B emitted from the second light collection optical system 41 to thereby convert the blue light B thus scattered into the blue light B having a light distribution similar to the light distribution of the fluorescence Y generated in the first light source device 11. As the scattering plate 42, there is used, for example, obscured glass made of optical glass.

The second pickup optical system 43 is provided with a first lens 43a and a second lens 43b. The second pickup optical system 43 substantially collimates the light emitted from the scattering plate 42. The first lens 43a and the second lens 43b are each formed of a convex lens.

In the present embodiment, the blue light B from the second light source device 12 is reflected by the dichroic mirror 13. The blue light B reflected by the dichroic mirror 13 is combined with the fluorescence Y which has a yellow color, which is emitted from the first light source device 11, and which is transmitted through the dichroic mirror 13, and turns to white light W. Subsequently, the white light W enters the homogenization illumination optical system 14.

The homogenization illumination optical system 14 has a first lens array 30, a second lens array 31, a polarization conversion element 32, and a superimposing lens 33.

The first lens array 30 has a plurality of first lenses 30a for dividing the light emitted from the dichroic mirror 13 into a plurality of partial light beams. The plurality of first lenses 30a is arranged in a matrix in a plane perpendicular to the illumination light axis 100ax.

The second lens array 31 has a plurality of second lenses 31a corresponding respectively to the plurality of first lenses 30a of the first lens array 30. The second lens array 31 focuses the image of each of the first lenses 30a of the first lens array 30 in the vicinity of each of the image forming areas of the light modulation devices 4R, 4G, and 4B in cooperation with the superimposing lens 33. The plurality of second lenses 31a is arranged in a matrix in a plane perpendicular to the illumination light axis 100ax.

The polarization conversion element 32 converts the white light W into linearly-polarized light having a predetermined vibration direction. The polarization conversion element 32 has a polarization separation film, a wave plate, and a mirror. The polarization conversion element 32 converts one linear polarization component into the other linear polarization component in order to uniform the polarization direction of the fluorescence Y as unpolarized light and the polarization direction of the blue light B with each other. The polarization conversion element 32 converts, for example, a P polarization component into an S polarization component.

The superimposing lens 33 collects the partial light beams from the polarization conversion element 32 to superimpose the partial light beams on one another in the vicinity of each of the image forming areas of the light modulation devices 4R, 4G, and 4B. The first lens array 30, the second lens array 31 and the superimposing lens 33 constitute an integrator optical system for homogenizing the in-plane light intensity distribution of the white light W.

Then, the configuration of the wavelength conversion element 23 will be described.

Figure 3:
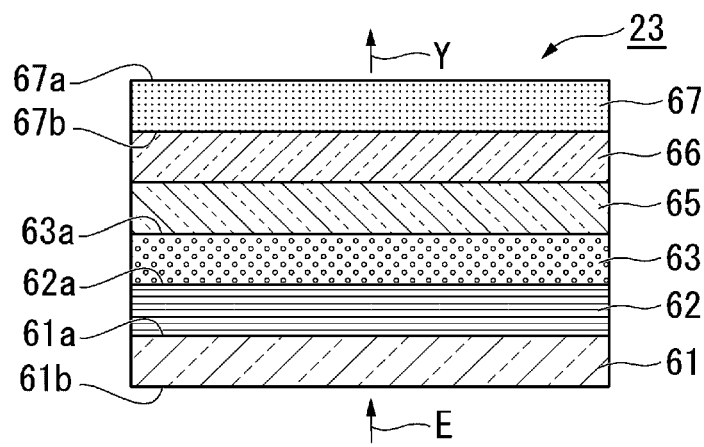
FIG. 3 is a cross-sectional view of a wavelength conversion element according to the first embodiment.

FIG. 3 is a cross-sectional view of the wavelength conversion element 23 according to the present embodiment.

As shown in FIG. 3, the wavelength conversion element 23 is provided with a substrate 61, a dichroic layer 62, an intermediate layer 63, a first bonding layer 65, a second bonding layer 66, and a wavelength conversion layer 67. The substrate 61, the dichroic layer 62, the intermediate layer 63, the first bonding layer 65, the second bonding layer 66, and the wavelength conversion layer 67 are stacked on one another in this order from a side which the excitation light beam E enters.

The substrate 61 has a first surface 61a from which the excitation light beam E is emitted, and a second surface 61b which is a surface different from the first surface 61a, and which the excitation light beam E enters. The substrate 61 is formed of a material high in thermal conductivity such as sapphire or silicon carbide (SiC). Since the heat generated in the wavelength conversion layer 67 is easily released when the substrate 61 is formed of a material having high thermal conductivity, it is preferable for the substrate 61 to be formed of the material having the high thermal conductivity.

The dichroic layer 62 is disposed on the first surface 61a of the substrate 61. The dichroic layer 62 has two or more types of refractive index layers having respective refractive indexes different from each other. In the present embodiment, the dichroic layer 62 is formed of a dielectric multilayer film obtained by alternately stacking a plurality of refractive index layers consisting of two types of layers such as an aluminum oxide layer ($AlO_X$) and a titanium oxide layer ($TiO_2$) on one another. The refractive index of aluminum oxide is 1.63, and the refractive index of titanium oxide is 2.4. The dichroic layer 62 transmits the excitation light beam E in the first wavelength band, and reflects the fluorescence Y in a second wavelength band.

Hereinafter, when the dielectric multilayer film is formed of two types of materials out of the plurality of refractive index layers constituting the dichroic layer 62, a refractive index layer having a first refractive index is referred to as a low-refractive index layer, and a refractive index layer having a second refractive index is referred to as a high-refractive index layer. In the case of the configuration described above, the aluminum oxide layer corresponds to the low-refractive index layer, and the titanium oxide layer corresponds to the high-refractive index layer. Further, the refractive index of the low-refractive index layer is described as $n_L$, and the refractive index of the high-refractive index layer is described as $n_H$. Therefore, the refractive index $n_H$ is higher than the refractive index $n_L$.

It should be noted that in the dielectric multilayer film constituted by three or more types of materials, the reflectance of the P-polarized light fails to become 0% in some cases. In these cases, when simulating the relationship between the incident angle and the average reflectance in a film configuration excluding the intermediate layer 63, the angle taking the smallest value can be assumed as a Brewster angle $\theta_B$ in the present disclosure.

The intermediate layer 63 is disposed on the first surface 62a of the dichroic layer 62. The intermediate layer 63 is formed of a material including at least one of, for example, silicon dioxide ($SiO_2$), magnesium fluoride ($MgF_2$), lithium fluoride (LiF), and calcium fluoride ($CaF_2$). Further, the intermediate layer 63 is formed of a porous material having a plurality of air holes, and made of the material described above. Since the intermediate layer 63 includes a plurality of air holes, the intermediate layer 63 has a refractive index lower than the refractive index of the simple material described above. Whatever materials described above are used, the refractive index $n_{Lm}$ of the intermediate layer 63 is not lower than 1.0 and not higher than 1.4. Although the reason will be described later, since it is desirable to make the refractive index $n_{Lm}$ of the intermediate layer 63 as low as possible, it is desirable for the intermediate layer 63 to be formed of a material including a plurality of air bubbles.

The first bonding layer 65 and the second bonding layer 66 are disposed between the intermediate layer 63 and the wavelength conversion layer 67. The first bonding layer 65 has contact with a first surface 63a of the intermediate layer 63. The second bonding layer 66 has contact with a second surface 67b of the wavelength conversion layer 67. The first bonding layer 65 and the second bonding layer 66 are used for bonding a first member including the substrate 61 and a second member including the wavelength conversion layer 67 to each other in a manufacturing process of the wavelength conversion layer 67 described later.

It is possible for the first bonding layer 65 and the second bonding layer 66 to be bonded to each other with, for example, two layers of plasma polymerized films using a silicon oxide series material. The present bonding is called a so-called GL (Glass-Like or GlueLess) bonding. As a constituent material of the plasma polymerized film, there can be cited a material including siloxane bond, and having an Si skeleton and an elimination group formed of an organic group to be coupled to the Si skeleton, a polymer substance including siloxane bond such as poly-organosiloxane, and so on. It should be noted that each of the plasma polymerized films can be formed of the same material or can also be formed of a different material as long as the siloxane bond is included.

Each of the plasma polymerized films has a property of being activated by being provided with energy due to, for example, plasma irradiation to thereby develop an adhesiveness. Therefore, according to the plasma polymerized film, it is possible to chemically bond the intermediate layer 63 and the wavelength conversion layer 67 to each other without using an adhesive or the like by using the adhesiveness developed by the energy irradiation. The two layers of plasma polymerized films have bonded interfaces chemically bonded to each other. Since in each of the plasma polymerized films, the methyl group in the siloxane bond is cut in the activation process, the content of the methyl group contained in the bonded interfaces is made lower compared to the content of the methyl group in each of the plasma polymerized films. The adhesiveness of the two layers of plasma polymerized films via the bonded interfaces is extremely strong. Therefore, the intermediate layer 63 and the wavelength conversion layer 67 are tightly bonded to each other with the plasma polymerized films.

The wavelength conversion layer 67 is disposed so as to be opposed to the dichroic layer 62 via the intermediate layer 63, the first bonding layer 65, and the second bonding layer 66. The wavelength conversion layer 67 has a first surface 67a from which the fluorescence Y is emitted, and a second surface 67b which is a surface different from the first surface 67a, and which the excitation light beam E enters. The wavelength conversion layer 67 includes ceramic phosphor for converting the excitation light beam E having the first wavelength band into the fluorescence Y having the second wavelength band different from the first wavelength band. The second wavelength band is a range of, for example, 490 through 750 nm, and the fluorescence Y is yellow light including the green light component and the red light component. It should be noted that it is also possible for the wavelength conversion layer 67 to include single-crystal phosphor.

The wavelength conversion layer 67 includes, for example, yttrium aluminum garnet (YAG) type phosphor. Citing YAG:Ce including cerium (Ce) as an activator agent as an example, as the wavelength conversion layer 67, there can be used a material obtained by mixing raw powder including constituent elements such as $Y_2O_3$, $Al_2O_3$, and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process, or a thermal plasma process. Further, the refractive index of YAG constituting the wavelength conversion layer 67 is 1.84.

A method of manufacturing the wavelength conversion element 23 according to the present embodiment will hereinafter be described.

FIG. 4A through FIG. 4E are cross-sectional views showing a method of manufacturing the wavelength conversion element according to the present embodiment following the process sequence.

Figure 4A:
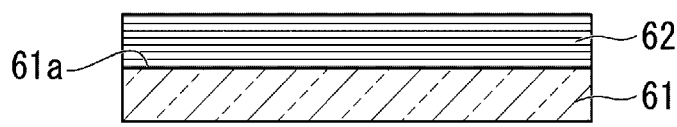
FIG. 4A is a cross-sectional view showing a method of manufacturing the wavelength conversion element according to the first embodiment following the process sequence.

As shown in FIG. 4A, the dichroic layer 62 formed of the dielectric multilayer film is formed (a first step) on the first surface 61a of the substrate 61 using a vacuum evaporation method, a sputtering method, or the like.

Figure 4B:
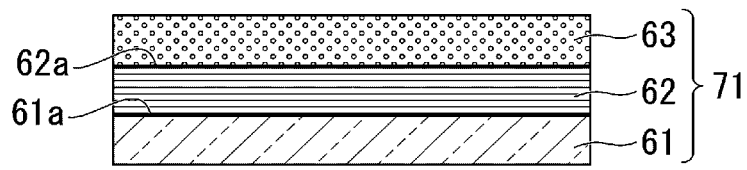
FIG. 4B is a cross-sectional view showing a process after the process in FIG. 4A.

Then, as shown in FIG. 4B, the intermediate layer 63 is formed (a second step) on the first surface 62a out of the two surfaces of the dichroic layer 62 using a vacuum evaporation method, a coating method, or the like. The first surface 62a in the present embodiment corresponds to a "third surface different from a second surface opposed to a first surface of a substrate" in the appended claims. Thus, a first member 71 including the substrate 61, the dichroic layer 62, and the intermediate layer 63 is manufactured. On this occasion, in order to form the intermediate layer 63 with the porous material, it is sufficient to use a variety of types of vacuum evaporation method such as an oblique evaporation method, a method of applying a binder including hollow beads made of the low-refractive index material, ora method of fixing minute beads using a calcination method.

Figure 4C:
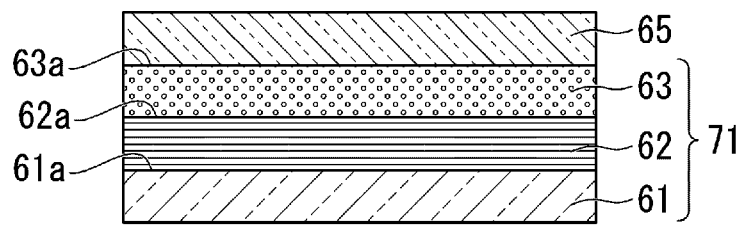
FIG. 4C is a cross-sectional view showing a process after the process in FIG. 4B.

Then, as shown in FIG. 4C, the first bonding layer 65 is formed on the first surface 63a of the intermediate layer 63 using a plasma chemical vapor-phase epitaxial method (a plasma CVD method) or the like. In other words, the first bonding layer 65 is provided (a third step) to the first member 71 including the substrate 61.

Figure 4D:
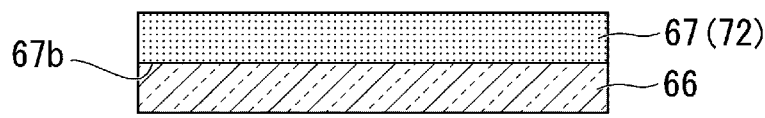
FIG. 4D is a cross-sectional view showing a process after the process in FIG. 4C.

Then, as shown in FIG. 4D, the second bonding layer 66 is formed on the second surface 67b of the wavelength conversion layer 67 using a plasma CVD method or the like. In other words, the second bonding layer 66 is provided (a fourth step) to a second member 72 including the wavelength conversion layer 67. It should be noted that the sequence of the third step and the fourth step is not particularly limited, and either of them can be performed first.

Figure 4E:
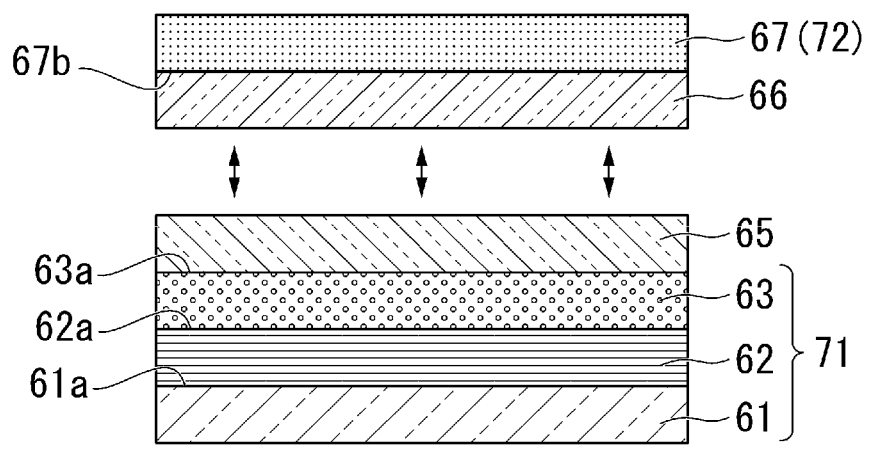
FIG. 4E is a cross-sectional view showing a process after the process in FIG. 4D.

Then, as shown in FIG. 4E, the plasma irradiation is performed on each of the first bonding layer 65 and the second bonding layer 66 to provide the energy thereto. Thus, the surface of each of the first bonding layer 65 and the second bonding layer 66 is activated to thereby develop the adhesive property.

Then, in the state in which the first bonding layer 65 and the second bonding layer 66 adhere to each other, the first member 71 and the second member 72 are pressurized at room temperature. Thus, the first bonding layer 65 and the second bonding layer 66 are bonded to each other (a fifth step).

The wavelength conversion element 23 according to the present embodiment is manufactured by the steps described above.

Here, in order to describe the problem of the wavelength conversion element 23 according to the present embodiment, there is assumed a wavelength conversion element according to a comparative example having the following configuration.

Figure 5A:
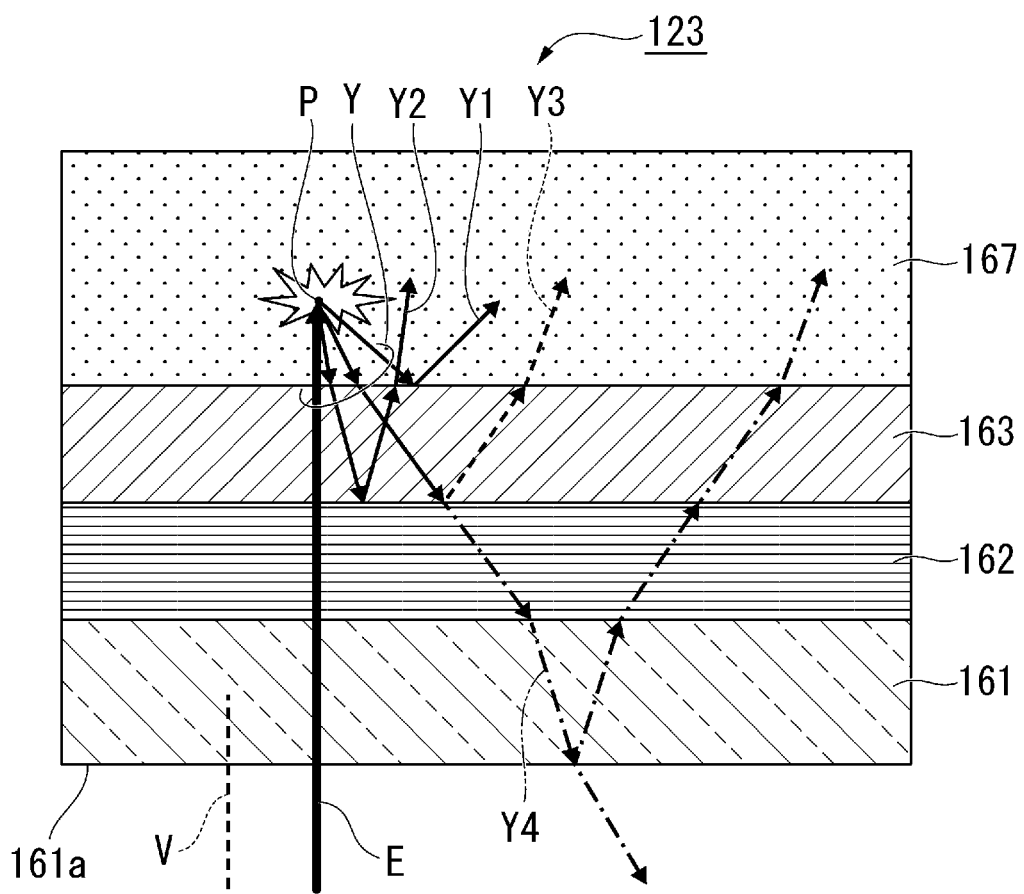
FIG. 5A is a cross-sectional view showing a wavelength conversion element according to a comparative example.

FIG. 5A is a cross-sectional view showing the wavelength conversion element 123 according to the comparative example.

As shown in FIG. 5A, the wavelength conversion element 123 according to the comparative example is provided with a substrate 161, a dichroic layer 162, an intermediate layer 163, and a wavelength conversion layer 167.

The substrate 161 is formed of, for example, sapphire. The thickness of the substrate 161 is in a range of, for example, 50 through 1000 μm. The refractive index of the substrate 161 is 1.75.

The dichroic layer 162 is formed of a dielectric multilayer film obtained by alternately stacking the low-refractive index layers made of silicon oxide and the high-refractive index layers made of titanium oxide on one another. The thickness of the dichroic layer 162 is in a range of 1 through 10 µm. The refractive index $n_L$ of the low-refractive index layers is 1.46. The refractive index $n_H$ of the high-refractive index layers is 2.4. The dichroic layer 162 is designed so as to transmit the excitation light beam E having entered the dichroic layer 162 from the substrate 161, and reflect the fluorescence Y which has been emitted from the wavelength conversion layer 167, and has entered the dichroic layer 162 via the intermediate layer 163.

The intermediate layer 163 is formed of, for example, silicon oxide. The thickness of the intermediate layer 163 is, for example, 1 µm. The refractive index $n_{Lm}$ of the intermediate layer 163 is 1.46.

The wavelength conversion layer 167 is formed of, for example, YAG. The refractive index $n_m$ of the wavelength conversion layer 167 is 1.84.

Here, when using the following formula (1) using the values of the refractive index $n_m$ of the wavelength conversion layer 167, the refractive index $n_{Lm}$ of the intermediate layer 163, the refractive index $n_L$ of the low-refractive index layers and the refractive index $n_H$ of the high-refractive index layers in the dichroic layer 162 in the present comparative example, it is possible to obtain the Brewster angle $\theta_B$ of the fluorescence Y emitted from the wavelength conversion layer 167. Further, by using the following formula (2), it is possible to obtain the total reflection angle $\theta_C$ of the fluorescence Y.

$$\theta_B = \sin^{-1}\sqrt{\frac{n_L^2 n_H^2}{n_m^2(n_L^2 + n_H^2)}} \quad (1)$$

$$\theta_C = \sin^{-1}\left(\frac{n_{Lm}}{n_m}\right) \quad (2)$$

It should be noted that the derivation process of the formula (1) will hereinafter briefly be described.

Figure 5B:
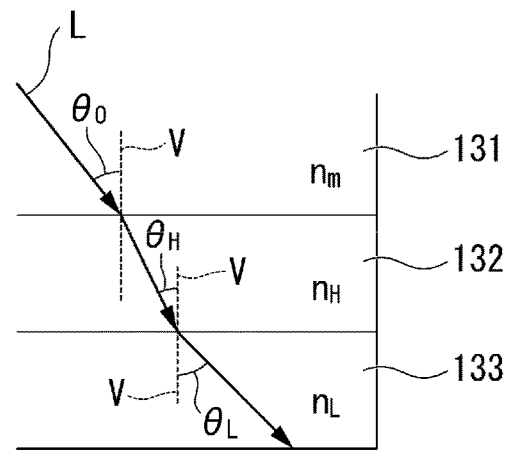
FIG. 5B is a diagram for explaining a derivation process of a formula (1).

When an incident medium 131 with the refractive index $n_m$, a high-refractive index layer 132 with the refractive index $n_H$, and a low-refractive index layer 133 with the refractive index $n_L$ are stacked on one another along the incident direction of the light L as described in FIG. 5B, an incident angle in the incident medium 131 is defined as an angle $\theta_O$, an incident angle in the high-refractive index layer 132 is defined as an angle $\theta_H$, and a refraction angle in the low-refractive index layer 133 is defined as an angle $\theta_L$ out of the angles formed between the normal line V with respect to the refractive index interface between the layers and the light beam L. Here, the following formula (3) is derived from a formula which expresses an optical admittance when the light L obliquely enters each of the refractive index interfaces, and the condition that the Brewster condition is fulfilled on the refractive index interface.

$$\sin^2\theta_H = n_L^2/(n_H^2 + n_L^2) \quad (3)$$

Meanwhile, the following formula (4) is derived from the Snell's law.

$$\sin^2\theta_H = (n_m^2/n_H^2)\sin^2\theta_O \quad (4)$$

The following formula (5) is derived from the formula (3) and the formula (4) described above.

$$n_m^2 \sin^2\theta_O = n_H^2 n_L^2/(n_H^2 + n_L^2) \quad (5)$$

In the present embodiment, in order to calculate the angle which fulfills the Brewster condition, when rewriting $\theta_O$ with $\theta_B$ in the formula (5), and then solving the formula (5) in terms of $\theta_B$, the formula (1) described above is obtained.

In the wavelength conversion element 123 according to the comparative example shown in FIG. 5A, when calculating the Brewster angle $\theta_B$ using the formula (1) assuming that the Brewster angle $\theta_B$ is expressed as the angle based on the normal line V of the first surface 161a of the substrate 161, the Brewster angle $\theta_B$ became about 44°. When calculating the total reflection angle $\theta_C$ using the formula (2), the total reflection angle $\theta_C$ became about 53°.

As shown in FIG. 5A, the fluorescence Y generated in the wavelength conversion layer 167 is isotropically emitted from a light emitting point P toward all directions. Here, among the entire fluorescence Y, a fluorescence component Y1 having an incident angle larger than the total reflection angle $\theta_C$, a fluorescence component Y2 having an incident angle larger than 0° and sufficiently smaller than the Brewster angle $\theta_B$, and an S-polarization component Y3 having an incident angle $\theta_B$, approximate to the Brewster angle $\theta_B$ are reflected by an interface between the wavelength conversion layer 167 and the intermediate layer 163 or an interface between the intermediate layer 163 and the dichroic layer 162. These three types of fluorescence components Y1, Y2, and Y3 are emitted from a place close to the light emitting point P, but does not significantly increase the light emission area. Therefore, the etendue is small, and good chemistry with the optical system in the posterior stage is achieved.

In contrast, a P-polarization component Y4 having an incident angle approximate to the Brewster angle $\theta_B$ is transmitted through the dichroic layer 162 and is then emitted to the outside from the substrate 161, or totally reflected by an interface between the substrate 161 and air. However, even when the P-polarization component Y4 is totally reflected by the interface between the substrate 161 and the air, the P-polarization component Y4 is emitted from a place far from the light emitting point P through the dichroic layer 162 and the intermediate layer 163. Such a fluorescence component Y4 is poor in chemistry with the optical system in the posterior stage, and becomes light unavailable in the optical system in the posterior stage, and therefore, the use efficiency of the fluorescence decreases.

Figure 6:
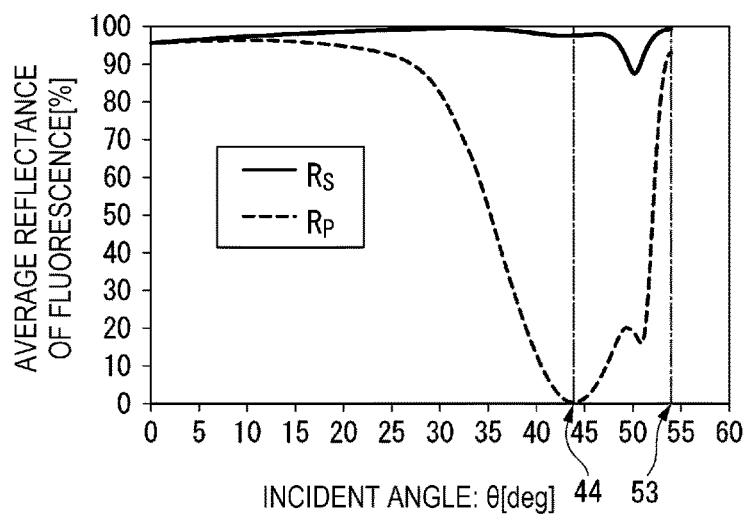
FIG. 6 is a graph showing an angular characteristic of reflectance of fluorescence entering an intermediate layer from a wavelength conversion layer in the wavelength conversion element according to the comparative example.

FIG. 6 shows a result of a simulation with respect to the wavelength conversion element 123 according to the comparative example conducted by the inventors, and shows an angular characteristic of the reflectance of the fluorescence Y viewed from the wavelength conversion layer 167. In FIG. 6, the horizontal axis represents an incident angle θ [deg], and the vertical axis represents an average reflectance [%] of the fluorescence Y. The graph with the solid line represents the average reflectance Rs of the S-polarization component, and the graph with the dotted line represents the average reflectance Rp of the P-polarization component.

It has been realized that the average reflectance is dramatically lower than 90% in a range of the incident angle of about 25 through 53° when focusing attention on the graph of the P-polarization component represented by the dotted line as shown in FIG. 6. As described above, in the wavelength conversion element 123 according to the comparative example, a large amount of the P-polarization component is emitted to the outside from the substrate 161, and the use efficiency of the fluorescence Y decreases.

Therefore, the inventors have realized that when making the Brewster angle $\theta_B$ larger than the total reflection angle $\theta_C$, it is possible to decrease the fluorescence component to be emitted to the outside from the substrate, and it is possible to increase the use efficiency of the fluorescence.

Here, as the wavelength conversion element 23 according to the present embodiment, there were used YAG having the refractive index $n_m$ of 1.84 as the wavelength conversion layer 67, aluminum oxide ($AlO_X$) having the refractive index $n_L$ of 1.63 as the low-refractive index layers of the dichroic layer 62, titanium oxide ($TiO_2$) having the refractive index $n_H$ of 2.4 as the high-refractive index layers thereof, and porous calcium fluoride ($CaF_2$) having the refractive index $n_{Lm}$ of 1.27 as the intermediate layer 63. Further, the number of layers of the dichroic layer 62 was set to 60. It should be noted that regarding the number of layers of the dichroic layer 62, since the difference in refractive index between the low-refractive index layers and the high-refractive index layers is smaller compared to that in the dichroic layer 162 in the comparative example, the number of layers has been increased in order to obtain an equivalent reflectance.

When calculating the Brewster angle $\theta_B$ using the formula (1) similarly to the comparative example using the configuration of the present embodiment, the Brewster angle $\theta_B$ became about 47°. Further, when calculating the total reflection angle $\theta_C$ using the formula (2), the total reflection angle $\theta_C$ became about 44°. As described above, in the present embodiment, in an opposite manner to the comparative example, the Brewster angle $\theta_B$ became larger than the total reflection angle $\theta_C$. It should be noted that the Brewster angle $\theta_B$ can be equal to the total reflection angle $\theta_C$. In other words, it is sufficient to fulfill $\theta_B \geq \theta_C$.

Figure 7:
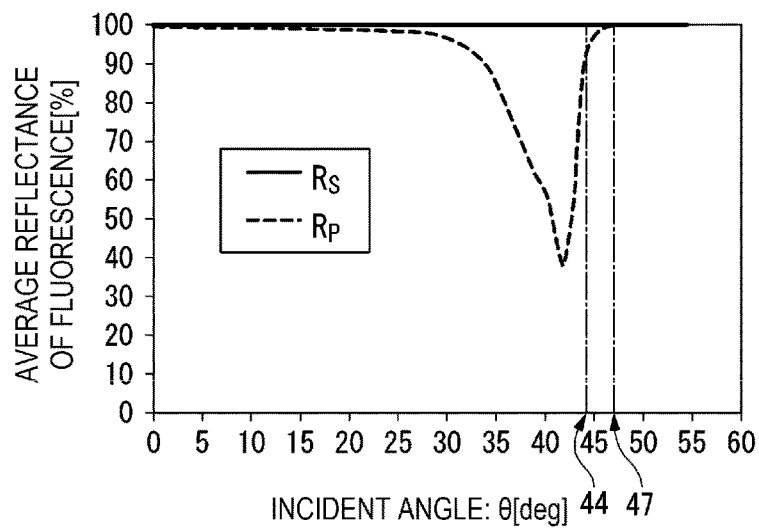
FIG. 7 is a graph showing an angular characteristic of reflectance of fluorescence entering an intermediate layer from a wavelength conversion layer in the wavelength conversion element according to a practical example.

FIG. 7 shows a result of a simulation in the wavelength conversion element 23 according to the present embodiment conducted by the inventors, and shows an angular characteristic of the reflectance of the fluorescence Y viewed from the wavelength conversion layer 67. In FIG. 7, the horizontal axis represents an incident angle $\theta$ [deg], and the vertical axis represents an average reflectance [%] of the fluorescence Y. The graph with the solid line represents the average reflectance Rs of the S-polarization component, and the graph with the dotted line represents the average reflectance Rp of the P-polarization component.

As shown in FIG. 7, when focusing attention on the graph of the P-polarization component represented by the dotted line, since the P-polarization component having the incident angle not smaller than 44° is totally reflected by the interface between the wavelength conversion layer 67 and the intermediate layer 63, the average reflectance Rp becomes substantially 100%. Further, since the Brewster angle $\theta_B$ is larger than the total reflection angle $\theta_C$, a part corresponding to a downward turning point, namely decrease in the average reflectance Rp of the P-polarization component, is smaller compared to that of the wavelength conversion element according to the comparative example. Thus, it is possible to reduce the fluorescence component to be emitted to the outside from the substrate 61, and it is possible to increase the use efficiency of the fluorescence Y.

Then, the inventors considered the refractive index $n_{Lm}$ of the intermediate layer 63.

Figure 8:
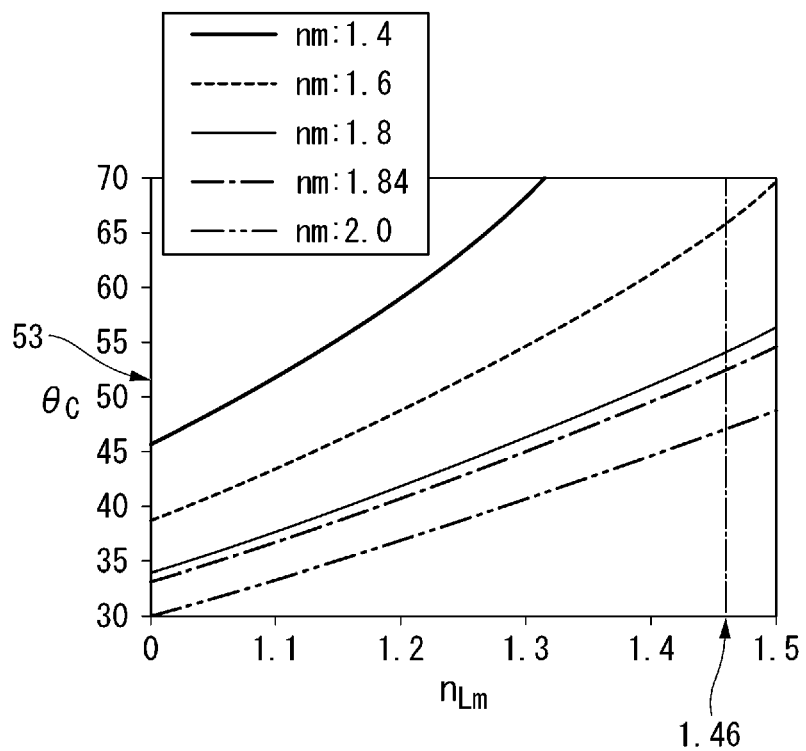
FIG. 8 is a graph showing a relationship between a refractive index and a total reflection angle of an intermediate layer when changing a refractive index of the wavelength conversion layer.

Here, the total reflection angle $\theta_C$ was calculated using the refractive index $n_{Lm}$ of the intermediate layer 63 as a variable while changing the refractive index $n_m$ of the wavelength layer 67 to five values of 1.4, 1.6, 1.8, 1.84, and 2.0 using the formula (2). FIG. 8 is a graph showing a result of the calculation of the total reflection angle $\theta_C$. In FIG. 8, the horizontal axis represents the refractive index $n_{Lm}$ of the intermediate layer 63, and the vertical axis represents the total reflection angle $\theta_C$ [deg].

It is preferable for the thickness of the intermediate layer 63 to be the thickness with which the evanescent wave can be ignored so as to sufficiently achieve the total reflection of the fluorescence Y, namely the thickness not smaller than twice as long as the wavelength. Specifically, it is preferable for the thickness of the intermediate layer 63 to be not larger than 800 nm.

It should be noted that in the wavelength conversion element 123 according to the comparative example, there is adopted silicon oxide as the intermediate layer 163 since silicon oxide is a standard material as the low-refractive index material. As a result, the result of the calculation of the total reflection angle $\theta_C$ became about 53°. Further, as a material having a refractive index lower than the refractive index of silicon oxide, there can be cited magnesium fluoride ($MgF_2$), but $MgF_2$ is rejected since the light scattering is apt to increase when depositing $MgF_2$ thick using a normal vacuum evaporation method.

In contrast, in the present embodiment, since it is attempted to make the total reflection angle $\theta_C$ smaller than the total reflection angle $\theta_C$ in the comparative example, it is preferable for the refractive index $n_{Lm}$ of the intermediate layer 63 to be lower than 1.46. Specifically, looking at FIG. 8, the refractive index $n_{Lm}$ of the intermediate layer 63 is in a range not lower than 1.0 and not higher than 1.4. It should be noted that in order to set the refractive index $n_{Lm}$ of the intermediate layer 63 in the range described above, it is difficult to realize the intermediate layer 63 with a dense film. Therefore, it is preferable to deposit the low-refractive index material in a porous state.

As a specific low-refractive index material, there is preferably used a material such as silicon oxide, magnesium fluoride, lithium fluoride, or calcium fluoride generally used for the low-refractive index layers since such materials are chemically stable and lack toxicity. In the case of the dense film, the refractive index of silicon oxide is 1.46, the refractive index of magnesium fluoride is 1.38, the refractive index of lithium fluoride is 1.39, and the refractive index of calcium fluoride is 1.44.

As the deposition method of making the low-refractive index material porous, it is sufficient to adopt, for example, a variety of vacuum evaporation methods such as an oblique evaporation method, or a coating method of fixing hollow beads of the low-refractive index material via a binder, fixing minute beads with a calcination method. Among the low-refractive index materials described above, calcium fluoride is easy to form a columnar structure by a simplified vacuum evaporation method, and can realize the porous low-refractive index layer with the refractive index of about 1.27 without using a special deposition method. Further, calcium fluoride has the thermal conductivity as high as 9.7 W/m·K in bulk, and is advantageous for heat radiation of the wavelength conversion layer even in the porous state, and is therefore preferably used.

When using the porous film as the intermediate layer 63, when the moisture in the atmosphere enters the air holes, the refractive index rises, and thus, the optical characteristic varies. Further, when the moisture in the porous film is rapidly heated, there is a possibility that separation of a film occurs due to the volume expansion, and thus, the reliability of the wavelength conversion element 23 decreases. Therefore, it is desirable for the intermediate layer 63 formed of the porous film to be covered with a barrier layer so that the external moisture does not enter the intermediate layer 63.

Then, the inventors considered the refractive index of the dichroic layer 62.

Basically, it is sufficient to respectively select the materials of the low-refractive index layers and the high-refractive index layers so that the refractive indexes of the low-refractive index layers and the high-refractive index layers constituting the dichroic layer 62 make the Brewster angle $\theta_B$ large based on the formula (2).

Figure 9:
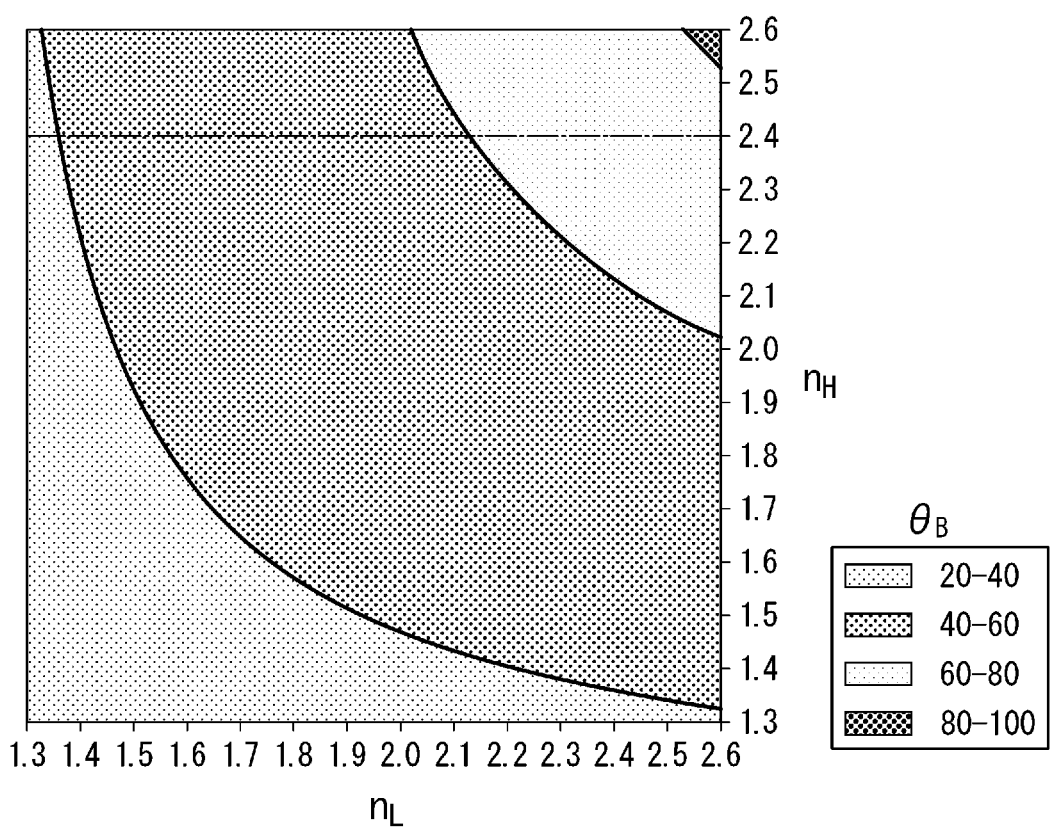
FIG. 9 is a graph showing a Brewster angle when changing a refractive index of low-refractive index layers and a refractive index of high-refractive index layers.

FIG. 9 is a graph showing a calculation result of the Brewster angle $\theta_B$ when fixing the refractive index $n_m$ of the wavelength conversion layer 67 to 1.84 and taking the refractive index $n_L$ of the low-refractive index layers and the refractive index $n_H$ of the high-refractive index layers as variables. In FIG. 9, the horizontal axis represents the refractive index $n_L$ of the low-refractive index layers, and the vertical axis represents the refractive index $n_H$ of the high-refractive index layers.

As shown in FIG. 9, since it is sufficient to reach the upper right area in the graph of FIG. 9 in order to increase the Brewster angle $\theta_B$, it is sufficient to increase both of the refractive index $n_L$ of the low-refractive index layers and the refractive index $n_H$ of the high-refractive index layers. The high-refractive index materials used generally are titanium oxide, niobium oxide, and so on, and the refractive indexes of these materials are about 2.4. Therefore, the materials of the low-refractive index layers will hereinafter be considered while fixing the refractive index $n_H$ of the high-refractive index layers is fixed to 2.4.

Figure 10:
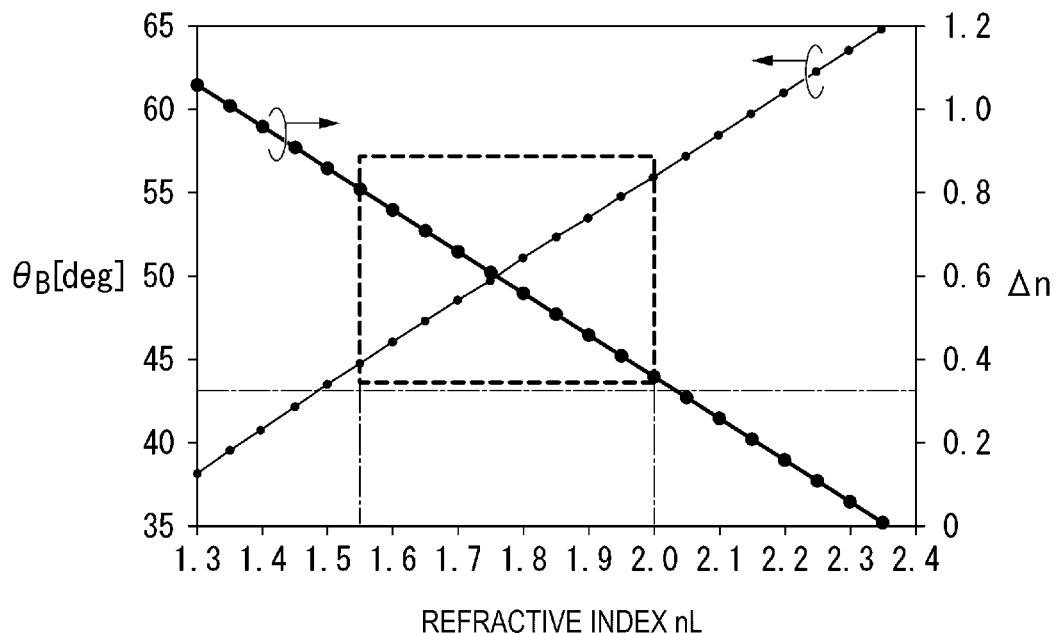
FIG. 10 is a graph showing a relationship between the refractive index of the low-refractive index layers and a Brewster angle, and a relationship between the refractive index of the low-refractive index layers and a refractive index difference.

FIG. 10 is a graph showing a relationship between the refractive index $n_L$ of the low-refractive index layers and the Brewster angle $\theta_B$, and a relationship between the refractive index $n_L$ of the low-refractive index layers and a refractive index difference $\Delta n$. In FIG. 10, the horizontal axis represents the refractive index $n_L$ of the low-refractive index layers, and the vertical axis at the left side represents the Brewster angle $\theta_B$ [deg], and the vertical axis at the right side represents the refractive index difference $\Delta n$. It should be noted that the refractive index difference $\Delta n$ is a difference between the refractive index $n_H$ of the high-refractive index layers and the refractive index $n_L$ of the low-refractive index layers.

As shown in FIG. 10, when increasing the refractive index $n_L$ of the low-refractive index layers, the Brewster angle $\theta_B$ tends to increase. For this reason, the higher the refractive index $n_L$ of the low-refractive index layers, the more preferable. In contrast, when increasing the refractive index $n_L$ of the low-refractive index layers, the refractive index difference $\Delta n$ tends to decrease. However, when the refractive index difference $\Delta n$ decreases, it becomes difficult to keep the reflectance of the dichroic layer 62. Therefore, it is desirable to set the refractive index $n_L$ of the low-refractive index layer within a range of 1.55 through 2.0 corresponding to the area in the frame of the dotted lines shown in FIG. 10.

It should be noted that when actually making the film design of the dichroic layer 62, it is sufficient to properly apply a material having a refractive index included in the range described above, and then repeat trial and error to decide the film design. As a specific material of the low-refractive index layers, there can be used, for example, aluminum oxide having the refractive index of 1.63, magnesium oxide having the refractive index of 1.7, yttrium oxide ($Y_2O_3$) having the refractive index of 1.87, a complex oxide including any of these materials, and so on.

To wrap up the above, it is preferable for the refractive index $n_H$ of the high-refractive index layers and the refractive index $n_L$ of the low-refractive index layers constituting the dichroic layer 62, and the refractive index $n_{Lm}$ of the intermediate layer 63 to fulfill a magnitude relationship of $n_H > n_L > n_{Lm}$.

Advantages of First Embodiment

The wavelength conversion element 23 according to the present embodiment is provided with the substrate 61, the dichroic layer 62 disposed on the first surface 61a of the substrate 61, the intermediate layer 63 disposed so as to be opposed to the substrate 61 via the dichroic layer 62, and the wavelength conversion layer 67 which is disposed so as to be opposed to the dichroic layer 62 via the intermediate layer 63 and which converts the excitation light beam E in the first wavelength band into the fluorescence Y in the second wavelength band different from the first wavelength band, wherein the dichroic layer 62 has the two or more types of refractive index layers having the respective refractive indexes different from each other, and when denoting the refractive index of the wavelength conversion layer 67 by $n_m$, the refractive index of the intermediate layer 63 by $n_{Lm}$, the refractive index of the low-refractive index layers by $n_L$, and the refractive index of the high-refractive index layers by $n_H$, $\theta_B \geq \theta_C$ is fulfilled with respect to the Brewster angle $\theta_B$ obtained by the formula (1) described above and the total reflection angle $\theta_C$ obtained by the formula (2) described above.

In the wavelength conversion element 23 according to the present embodiment, it is possible to set the average reflectance Rp of the P-polarization component entering the interface between the wavelength conversion layer 67 and the intermediate layer 63 at an incident angle not smaller than the total reflection angle $\theta_C$ to substantially 100%. Further, since the Brewster angle $\theta_B$ is made not smaller than the total reflection angle $\theta_C$, it is possible to suppress the decrease in the average reflectance Rp of the P-polarization component to a lower level compared to the wavelength conversion element according to the comparative example in which the Brewster angle $\theta_B$ is smaller than the total reflection angle $\theta_C$. As a result, it is possible to realize the wavelength conversion element 23 high in use efficiency of the fluorescence Y.

In the wavelength conversion element 23 according to the present embodiment, the refractive index $n_{Lm}$ of the intermediate layer 63 is not lower than 1.0 and not higher than 1.4.

In the wavelength conversion element 123 according to the comparative example using YAG as the material of the wavelength conversion layer 167 and silicon oxide as the material of the intermediate layer 163, the total reflection angle $\theta_C$ becomes about 53°. In contrast, in the wavelength conversion element 23 according to the present embodiment, in order to fulfill the condition of $\theta_B \geq \theta_C$, the smaller the total reflection angle $\theta_C$ of the intermediate layer 63 is, the more preferable. From this viewpoint, by making the refractive index $n_{Lm}$ of the intermediate layer 63 not lower than 1.0 and not higher than 1.4, it is possible to make the total reflection angle $\theta_C$ smaller than 53°.

In the wavelength conversion element 23 according to the present embodiment, the intermediate layer 63 is formed of the porous material.

It is difficult to find out a material the refractive index $n_{Lm}$ of which fulfills the condition of not lower than 1.0 and not higher than 1.4 among the low-refractive index materials used generally. In contrast, when the intermediate layer 63 is formed of a porous material, since the air is included in the material of the intermediate layer 63, it is easy to realize the refractive index $n_{Lm}$ included in the range described above.

It is desirable for the wavelength conversion element 23 according to the present embodiment to further be provided with the barrier layer covering the intermediate layer 63.

According to this configuration, it is possible to prevent the moisture in the atmosphere from entering the air holes. As a result, it is possible to keep the low refractive index, and it is possible to suppress the variation in optical characteristic. Further, it is possible to prevent the separation of the film due to the volume expansion of the moisture in the porous film, and thus, it is possible to prevent the reliability of the wavelength conversion element 23 from deteriorating.

In the wavelength conversion element 23 according to the present embodiment, it is desirable for the intermediate layer 63 to be formed of a material including at least one of silicon oxide, magnesium fluoride, lithium fluoride, and calcium fluoride.

The materials described above are chemically stable, and lack toxicity, and therefore, preferably used as the low-refractive index material.

In the wavelength conversion element 23 according to the present embodiment, the dichroic layer 62 transmits the excitation light beam E in the first wavelength band, and reflects the fluorescence Y in the second wavelength band.

According to this configuration, it is possible to realize the wavelength conversion element 23 of a transmissive type and high in use efficiency of the fluorescence Y.

The first light source device 11 according to the present embodiment is provided with the wavelength conversion element 23 according to the present embodiment, and the light emitting element 20a1 for emitting the excitation light beam E in the first wavelength band to the wavelength conversion element 23.

According to this configuration, it is possible to realize the first light source device 11 high in use efficiency of the fluorescence Y.

The projector 1 according to the present embodiment is provided with the first light source device 11 according to the present embodiment, the light modulation devices 4B, 4G, and 4R for modulating the light from the first light source device 11 in accordance with the image information, and the projection optical device 6 for projecting the light modulated by the light modulation devices 4B, 4G, and 4R.

According to this configuration, it is possible to realize the projector 1 high in efficiency.

The method of manufacturing the wavelength conversion element 23 according to the present embodiment is provided with the first step of forming the dichroic layer 62 on the first surface 61a of the substrate 61, the second step of forming the intermediate layer 63 on a surface different from a surface opposed to the first surface 61a of the substrate 61 out of the two surfaces of the dichroic layer 62, the third step of providing the first bonding layer 65 to the first member 71 including the substrate 61, the fourth step of providing the second bonding layer 66 to the second member 72 including the wavelength conversion layer 67, and the fifth step of bonding the first bonding layer 65 and the second bonding layer 66 to each other, wherein the dichroic layer 62 has the two or more types of refractive index layers having the respective refractive indexes different from each other, and the condition of $\theta_B \geq \theta_C$ is fulfilled with respect to $\theta_B$ obtained by the formula (1) described above and $\theta_C$ obtained by the formula (2) described above.

According to this manufacturing method, it is possible to manufacture the wavelength conversion element 23 high in use efficiency of the fluorescence.

Second Embodiment

Hereinafter, a second embodiment of the present disclosure will be described using FIG. 11 through FIG. 12F.

The configurations of a projector and a light source device according to the second embodiment are substantially the same as those in the first embodiment, and the configuration of the wavelength conversion element is different from that of the first embodiment. Therefore, the description of the projector and the light source device will be omitted.

Figure 11:
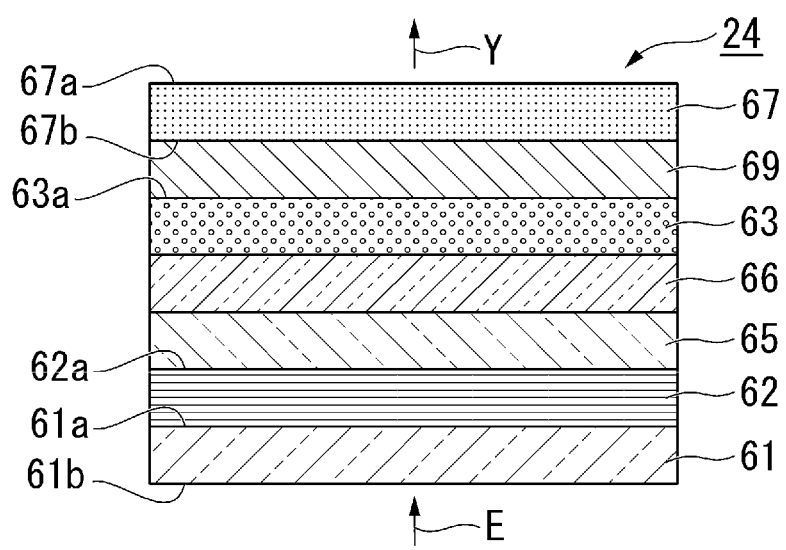
FIG. 11 is a cross-sectional view of a wavelength conversion element according to a second embodiment.

FIG. 11 is a cross-sectional view of a wavelength conversion element 24 according to the second embodiment.

In FIG. 11, the constituents common to the drawing used in the first embodiment are denoted by the same reference symbols, and the description thereof will be omitted.

As shown in FIG. 11, the wavelength conversion element 24 according to the present embodiment is provided with the substrate 61, the dichroic layer 62, the first bonding layer 65, the second bonding layer 66, the intermediate layer 63, a matching layer 69, and the wavelength conversion layer 67. The substrate 61, the dichroic layer 62, the first bonding layer 65, the second bonding layer 66, the intermediate layer 63, the matching layer 69, and the wavelength conversion layer 67 are stacked on one another in this order from a side which the excitation light beam E enters.

In the wavelength conversion element 23 according to the first embodiment, there are disposed the first bonding layer 65 and the second bonding layer 66 between the wavelength conversion layer 67 and the intermediate layer 63. In contrast, in the wavelength conversion element 24 according to the present embodiment, there are disposed the first bonding layer 65 and the second bonding layer 66 between the intermediate layer 63 and the dichroic layer 62. The configuration of the first bonding layer 65 and the second bonding layer 66 is substantially the same as those in the first embodiment.

The matching layer 69 is disposed between the wavelength conversion layer 67 and the intermediate layer 63. The matching layer 69 is formed of a material having a refractive index between the refractive index of the wavelength conversion layer 67 and the refractive index $n_{Lm}$ of the intermediate layer 63. Specifically, the matching layer 69 is formed of a material such as silicon oxide or alumina. It should be noted that also in the wavelength conversion element 23 according to the first embodiment, the matching layer 69 can be disposed between the wavelength conversion layer 67 and the second bonding layer 66.

A method of manufacturing the wavelength conversion element 24 according to the present embodiment will hereinafter be described.

FIG. 12A through FIG. 12F are cross-sectional views showing the method of manufacturing the wavelength conversion element 24 according to the present embodiment following the process sequence.

Figure 12A:
FIG. 12A is a cross-sectional view showing a method of manufacturing the wavelength conversion element according to the second embodiment following the process sequence.

As shown in FIG. 12A, the dichroic layer 62 is formed (the first step) on the first surface 61a of the substrate 61 using a vacuum evaporation method, a sputtering method, or the like. Thus, a first member 73 including the substrate 61 and the dichroic layer 62 is manufactured.

Figure 12B:
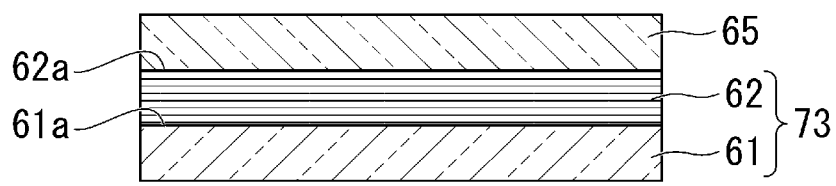
FIG. 12B is a cross-sectional view showing a process after the process in FIG. 12A.

Then, as shown in FIG. 12B, the first bonding layer 65 is formed on the first surface 62a of the dichroic layer 62 out of two surfaces of the dichroic layer 62 using a plasma CVD method or the like. In other words, the first bonding layer 65 is provided (the third step) to the first member 73 including the substrate 61.

Figure 12C:
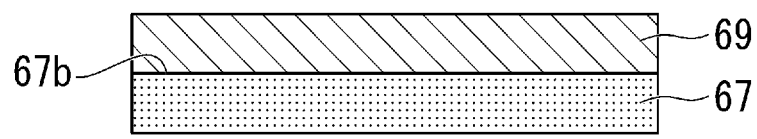
FIG. 12C is a cross-sectional view showing a process after the process in FIG. 12B.

Then, as shown in FIG. 12C, the matching layer 69 made of a material such as silicon oxide or alumina is formed on the second surface 67b of the wavelength conversion layer 67 using a plasma CVD method or the like.

Figure 12D:
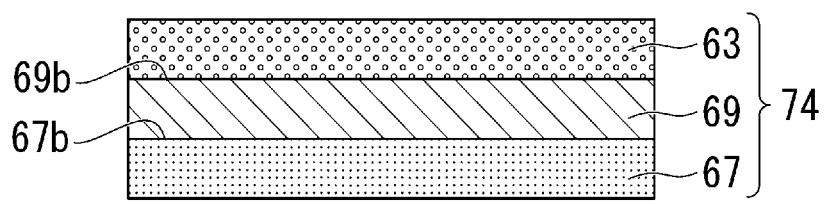
FIG. 12D is a cross-sectional view showing a process after the process in FIG. 12C.

Then, as shown in FIG. 12D, the intermediate layer 63 is formed (the second step) on a second surface 69b of the matching layer 69 so as to be opposed to the second surface 67b of the wavelength conversion layer 67. On this occasion, in order to form the intermediate layer 63 with the porous material, it is sufficient to use a variety of types of vacuum evaporation method such as an oblique evaporation method, a method of applying a binder including hollow beads made of the low-refractive index material, or a method of fixing minute beads using a calcination method. Thus, a second member 74 including the wavelength conversion layer 67, the matching layer 69, and the intermediate layer 63 is manufactured.

Figure 12E:
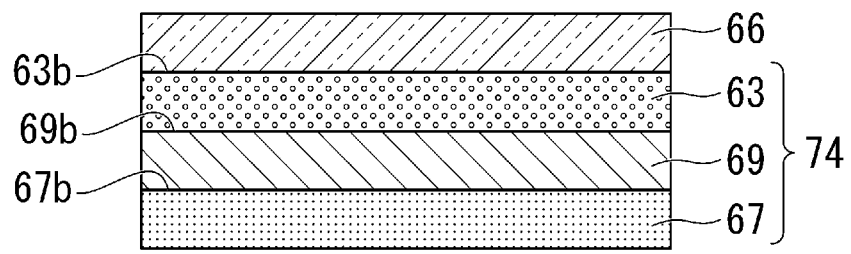
FIG. 12E is a cross-sectional view showing a process after the process in FIG. 12D.

Then, as shown in FIG. 12E, the second bonding layer 66 is formed on the second surface 63b of the intermediate layer 63 using a plasma CVD method or the like. In other words, the second bonding layer 66 is provided (the fourth step) to a second member 74 including the wavelength conversion layer 67. It should be noted that the sequence of the third step and the fourth step is not particularly limited, and either of them can be performed first.

Figure 12F:
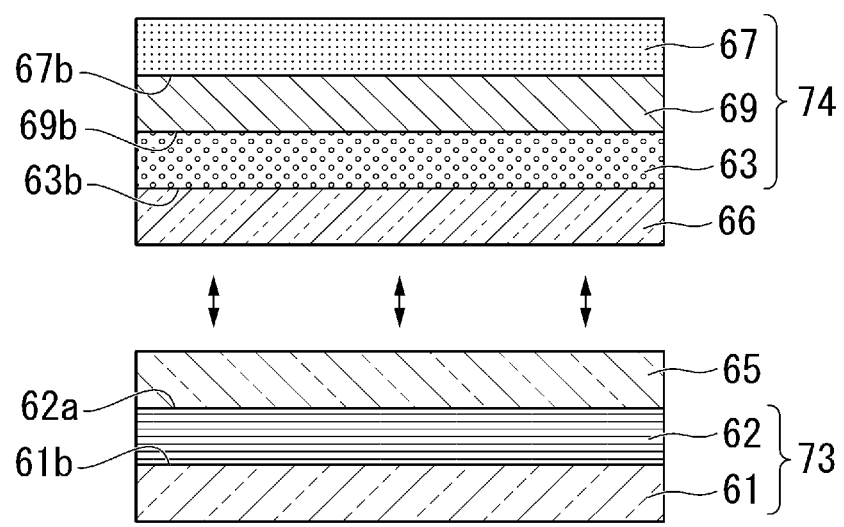
FIG. 12F is a cross-sectional view showing a process after the process in FIG. 12E.

Then, as shown in FIG. 12F, the plasma irradiation is performed on each of the first bonding layer 65 and the second bonding layer 66 to provide the energy thereto. Thus, the surface of each of the first bonding layer 65 and the second bonding layer 66 is activated to thereby develop the adhesive property.

Then, in the state in which the first bonding layer 65 and the second bonding layer 66 adhere to each other, the first member 73 and the second member 74 are pressurized at room temperature. Thus, the first bonding layer 65 and the second bonding layer 66 are bonded to each other (the fifth step).

The wavelength conversion element 24 according to the present embodiment is manufactured by the steps described above.

Advantages of Second Embodiment

Also in the present embodiment, it is possible to obtain substantially the same advantages as in the first embodiment such as an advantage that it is possible to realize the wavelength conversion element 24 and the first light source device 11 high in use efficiency of the fluorescence Y, an advantage that it is possible to realize the projector 1 high in efficiency, or an advantage that it is possible to manufacture the wavelength conversion element 24 high in use efficiency of the fluorescence Y.

It should be noted that the scope of the present disclosure is not limited to the embodiments described above, but a variety of modifications can be provided thereto within the scope or the spirit of the present disclosure.

For example, in the embodiment described above, the stacking sequence of the intermediate layer, the dichroic layer, the first bonding layer, and the second bonding layer is not limited since optical equivalence is obtained irrespective of the stacking sequence. It should be noted that when the intermediate layer is formed of a porous material, it is not preferable to form the dielectric multilayer film on the porous material since the flatness of the dielectric multilayer film deteriorates, and there is a possibility that the light scattering occurs. Therefore, it is desirable to adopt a configuration in which each of the films can be deposited without using a process of forming the dielectric multilayer film on the porous material.

Further, it is possible for the first bonding layer or the second bonding layer having contact with the intermediate layer to also function as the barrier layer. In this case, it is desirable to form the film using a CVD method, an atomic layer deposition method (ALD method), a sputtering method which are excellent in coverage property on the intermediate layer as a foundation film, and which are high in flatness.

In the embodiments described above, there is cited an example of the stationary wavelength conversion element which is not made rotatable, but the present disclosure can also be applied to a light source device having a wavelength conversion element which is made rotatable using a motor. Further, the wavelength conversion layer can be formed of a phosphor having a light transmissive property, or can be formed of a phosphor having a scattering property.

A dichroic layer for transmitting the excitation light and reflecting the fluorescence can be disposed on a surface of the substrate at a side which the excitation light enters. Further, a matching layer or an antireflection layer for reducing the interfacial reflection can be disposed on a variety of types of interface such as a surface of the substrate at the side which the excitation light enters, or a surface on which the wavelength conversion layer and each of the bonding layers have contact with each other.

Further, regarding the bonding method between the first bonding layer and the second bonding layer, there can be used, for example, an atomic diffusion bonding method besides the plasma polymerization method used in the embodiments described above. Besides the above, it is possible to adopt a variety of types of bonding method using a dry method or a wet method.

Besides the above, the specific descriptions of the shape, the number, the arrangement, the material, and so on of each of the constituents of the wavelength conversion element, the light source device, and the projector are not limited to those of the embodiments described above, but can arbitrarily be modified. Although in each of the embodiments, there is described the example of installing the light source device according to the present disclosure in the projector using the liquid crystal light valves, the example is not a limitation. The light source device according to the present disclosure can also be installed in the projector using digital micromirror devices as the light modulation devices. Further, the projector is not required to have a plurality of light modulation devices, and can be provided with just one light modulation device.

Although in each of the embodiments, there is described the example of installing the light source device according to the present disclosure in the projector, the example is not a limitation. The light source device according to the present disclosure can also be applied to lighting equipment, a headlight of a vehicle, and so on.

It is also possible for the wavelength conversion element according to an aspect of the present disclosure to have the following configuration.

The wavelength conversion element according to an aspect of the present disclosure includes a substrate, a dichroic layer provided to a first surface of the substrate, an intermediate layer disposed so as to be opposed to the substrate via the dichroic layer, and a wavelength conversion layer disposed so as to be opposed to the dichroic layer via the intermediate layer, and configured to convert light in a first wavelength band into light in a second wavelength band different from the first wavelength band, wherein the dichroic layer has two or more types of refractive index layers having respective refractive indexes different from each other, and when denoting a refractive index of the wavelength conversion layer by $n_m$, a refractive index of the intermediate layer by $n_{Lm}$, a refractive index of a refractive index layer having a first refractive index out of the two or more types of refractive index layers by $n_L$, and a refractive index of a refractive index layer having a second refractive index out of the two or more types of refractive layers by $n_H$, and $n_H$ is higher than $n_L$, $\theta_B \geq \theta_C$ is fulfilled with respect to $\theta_B$ obtained by a formula (1) described below and $\theta_C$ obtained by a formula (2) described below.

$$\theta_B = \sin^{-1}\sqrt{\frac{n_L^2 n_H^2}{n_m^2(n_L^2 + n_H^2)}} \quad (1)$$

$$\theta_C = \sin^{-1}\left(\frac{n_{Lm}}{n_m}\right) \quad (2)$$

In the wavelength conversion element according to the aspect of the present disclosure, the refractive index of the intermediate layer may be not lower than 1.0 and not higher than 1.4.

In the wavelength conversion element according to the aspect of the present disclosure, the intermediate layer may be formed of a porous material.

The wavelength conversion element according to the aspect of the present disclosure may further include a barrier layer configured to cover the intermediate layer.

In the wavelength conversion element according to the aspect of the present disclosure, the intermediate layer may be formed of a material including at least one of silicon oxide, magnesium fluoride, lithium fluoride, and calcium fluoride.

In the wavelength conversion element according to the aspect of the present disclosure, the dichroic layer may transmit the light in the first wavelength band, and reflect the light in the second wavelength band.

It is also possible for the light source device according to an aspect of the present disclosure to have the following configuration.

The light source device according to an aspect of the present disclosure includes the wavelength conversion element according to the aspect of the present disclosure, and a light emitting element configured to emit the light in the first wavelength band to the wavelength conversion element.

It is also possible for the projector according to an aspect of the present disclosure to have the following configuration.

The projector according to another aspect of the present disclosure includes the light source device according to the aspect of the present disclosure, a light modulation device configured to modulate light from the light source device in accordance with image information, and a projection optical device configured to project the light modulated by the light modulation device.

It is also possible for the method of manufacturing the wavelength conversion element according to an aspect of the present disclosure to have the following configuration.

The method of manufacturing a wavelength conversion element according to another aspect of the present disclosure includes a first step of providing a dichroic layer to a first surface of a substrate, a second step of forming an intermediate layer on a third surface different from a second surface opposed to the first surface of the substrate out of two surfaces of the dichroic layer, or so as to be opposed to a fourth surface of the wavelength conversion layer, a third step of providing a first bonding layer to a first member including the substrate, a fourth step of providing a second bonding layer to a second member including the wavelength conversion layer, and a fifth step of bonding the first bonding layer and the second bonding layer to each other, wherein the dichroic layer has two or more types of refractive index layers having respective refractive indexes different from each other, and when denoting a refractive index of the wavelength conversion layer by $n_m$, a refractive index of the intermediate layer by $n_{Lm}$, a refractive index of a refractive index layer having a first refractive index out of the two or more types of refractive index layers by $n_L$, and a refractive index of a refractive index layer having a second refractive index out of the two or more types of refractive layers by $n_H$, and $n_H$ is higher than $n_L$, $\theta_B \geq \theta_C$ is fulfilled with respect to $\theta_B$ obtained by a formula (1) described below and $\theta_C$ obtained by a formula (2) described below.

$$\theta_B = \sin^{-1}\sqrt{\frac{n_L^2 n_H^2}{n_m^2(n_L^2 + n_H^2)}} \quad (1)$$

$$\theta_C = \sin^{-1}\left(\frac{n_{Lm}}{n_m}\right) \quad (2)$$

What is claimed is:

1. A wavelength conversion element comprising:
a substrate;
a dichroic layer provided to a first surface of the substrate;
an intermediate layer disposed so as to be opposed to the substrate via the dichroic layer; and
a wavelength conversion layer disposed so as to be opposed to the dichroic layer via the intermediate layer, and configured to convert light in a first wavelength band into light in a second wavelength band different from the first wavelength band, wherein
the dichroic layer has two or more types of refractive index layers having respective refractive indexes different from each other, and
when denoting a refractive index of the wavelength conversion layer by $n_m$, a refractive index of the intermediate layer by $n_{Lm}$, a refractive index of a refractive index layer having a first refractive index out of the two or more types of refractive index layers by $n_L$, and a refractive index of a refractive index layer having a second refractive index out of the two or more types of refractive layers by $n_H$, and $n_H$ is higher than $n_L$,
$\theta_B \geq \theta_C$ is fulfilled with respect to $\theta_B$ obtained by a formula (1) described below and $\theta_C$ obtained by a formula (2) described below:

$$\theta_B = \sin^{-1}\sqrt{\frac{n_L^2 n_H^2}{n_m^2(n_L^2 + n_H^2)}} \quad (1)$$

$$\theta_C = \sin^{-1}\left(\frac{n_{Lm}}{n_m}\right), \quad (2)$$

wherein the $\theta_B$ corresponds to an angle that satisfies Brewster's condition at an interface between the wavelength conversion layer and the dichroic layer, and
the $\theta_C$ is an total reflection angle at an interface between the wavelength conversion layer and the intermediate layer.

2. The wavelength conversion element according to claim 1, wherein
the refractive index of the intermediate layer is not lower than 1.0 and not higher than 1.4.

3. The wavelength conversion element according to claim 2, wherein
the intermediate layer is formed of a porous material.

4. The wavelength conversion element according to claim 3, further comprising:
a barrier layer configured to cover the intermediate layer.

5. The wavelength conversion element according to claim 1, wherein
the intermediate layer is formed of a porous material.

6. The wavelength conversion element according to claim 5, further comprising:
a barrier layer configured to cover the intermediate layer.

7. The wavelength conversion element according to claim 1, wherein
the intermediate layer is formed of a material including at least one of silicon oxide, magnesium fluoride, lithium fluoride, and calcium fluoride.

8. The wavelength conversion element according to claim 1, wherein
the dichroic layer transmits the light in the first wavelength band, and reflects the light in the second wavelength band.

9. A light source device comprising:
the wavelength conversion element according to claim 1; and
a light emitting element configured to emit the light in the first wavelength band to the wavelength conversion element.

10. A projector comprising:
the light source device according to claim 9;
a light modulation device configured to modulate light from the light source device in accordance with image information; and
a projection optical device configured to project the light modulated by the light modulation device.

11. A method of manufacturing a wavelength conversion element, the method comprising:
a first step of providing a dichroic layer to a first surface of a substrate;
a second step of forming an intermediate layer on a third surface different from a second surface opposed to the first surface of the substrate out of two surfaces of the dichroic layer, or so as to be opposed to a fourth surface of a wavelength conversion layer;
a third step of providing a first bonding layer to a first member including the substrate;
a fourth step of providing a second bonding layer to a second member including the wavelength conversion layer; and
a fifth step of bonding the first bonding layer and the second bonding layer to each other, wherein
the dichroic layer has two or more types of refractive index layers having respective refractive indexes different from each other, and
when denoting a refractive index of the wavelength conversion layer by $n_m$, a refractive index of the intermediate layer by $n_{Lm}$, a refractive index of a refractive index layer having a first refractive index out of the two or more types of refractive index layers by $n_L$, and a refractive index of a refractive index layer having a second refractive index out of the two or more types of refractive layers by $n_H$, and $n_H$ is higher than $n_L$, $\theta_B \geq \theta_C$ is fulfilled with respect to $\theta_B$ obtained by a formula (1) described below and $\theta_C$ obtained by a formula (2) described below:

$$\theta_B = \sin^{-1} \sqrt{\frac{n_L^2 n_H^2}{n_m^2(n_L^2 + n_H^2)}} \quad (1)$$

$$\theta_C = \sin^{-1}\left(\frac{n_{Lm}}{n_m}\right), \quad (2)$$

wherein the $\theta_B$ corresponds to an angle that satisfies Brewster's condition at an interface between the wavelength conversion layer and the dichroic layer, and
the $\theta_C$ is an total reflection angle at an interface between the wavelength conversion layer and the intermediate layer.

12. A wavelength conversion element comprising:
a substrate;
a dichroic layer provided to a first surface of the substrate;
an intermediate layer disposed so as to be opposed to the substrate via the dichroic layer; and
a wavelength conversion layer disposed so as to be opposed to the dichroic layer via the intermediate layer, and configured to convert light in a first wavelength band into light in a second wavelength band different from the first wavelength band, wherein
the dichroic layer has two or more types of refractive index layers having respective refractive indexes different from each other, and
when denoting a refractive index of the wavelength conversion layer by $n_m$, a refractive index of the intermediate layer by $n_{Lm}$, a refractive index of a refractive index layer having a first refractive index out of the two or more types of refractive index layers by $n_L$, and a refractive index of a refractive index layer having a second refractive index out of the two or more types of refractive layers by $n_H$, and $n_H$ is higher than $n_L$,
$\theta_B \geq \theta_C$ is fulfilled with respect to $\theta_B$ obtained by a formula (1) described below and $\theta_C$ obtained by a formula (2) described below:

$$\theta_B = \sin^{-1} \sqrt{\frac{n_L^2 n_H^2}{n_m^2(n_L^2 + n_H^2)}} \quad (1)$$

$$\theta_C = \sin^{-1}\left(\frac{n_{Lm}}{n_m}\right) \quad (2)$$

wherein the intermediate layer is formed of a material including at least one of silicon oxide, magnesium fluoride, lithium fluoride, and calcium fluoride.

* * * * *